May 29, 1934.  H. R. VAN DEVENTER ET AL  1,960,324
ELECTRIC MOTOR UNIT
Filed Sept. 23, 1929

Harry P. Van Deventer
Samuel C. McKeown
INVENTORS

BY
Spencer Hardman & Tyler
ATTORNEYS

Patented May 29, 1934

1,960,324

UNITED STATES PATENT OFFICE 1,960,324

ELECTRIC MOTOR UNIT

Harry R. Van Deventer, New York, and Samuel C. McKeown, Mount Vernon, N. Y., assignors, by mesne assignments, to Frigidaire Corporation, Dayton, Ohio, a corporation of Delaware Application September 23, 1929, Serial No. 394,420

3 Claims. (Cl. 172—36)

This invention relates to electric motors, and particularly to those which are entirely enclosed within a gas or fluid tight casing as in enclosed motor refrigerating systems, where a motor-pump unit is commonly employed.

In such refrigerating systems, it is necessary to provide means for circulating air around the condensing coils for the purpose of cooling and condensing the refrigerating gas therein and where the motor driving the pump or compressor is enclosed within a gas tight casing it has been customary to provide a separate motor driving a fan for this purpose, this fan motor being mounted outside the casing constituting the motor-pump unit and often forming the condenser thereof.

Our invention relates to new and improved methods of utilizing the motor and/or parts of the motor which drives the pump in such units, to drive the cooling fan as well, or to provide a means for utilizing the power of the motor outside the gas tight casing enclosing the motor, without the use of a shaft extending through the casing.

Further objects and advantages of the present invention will be apparent from the following description, reference being had to the accompanying drawing, wherein a preferred form of the present invention is clearly shown.

In the drawing:—

Figures 1, 2:
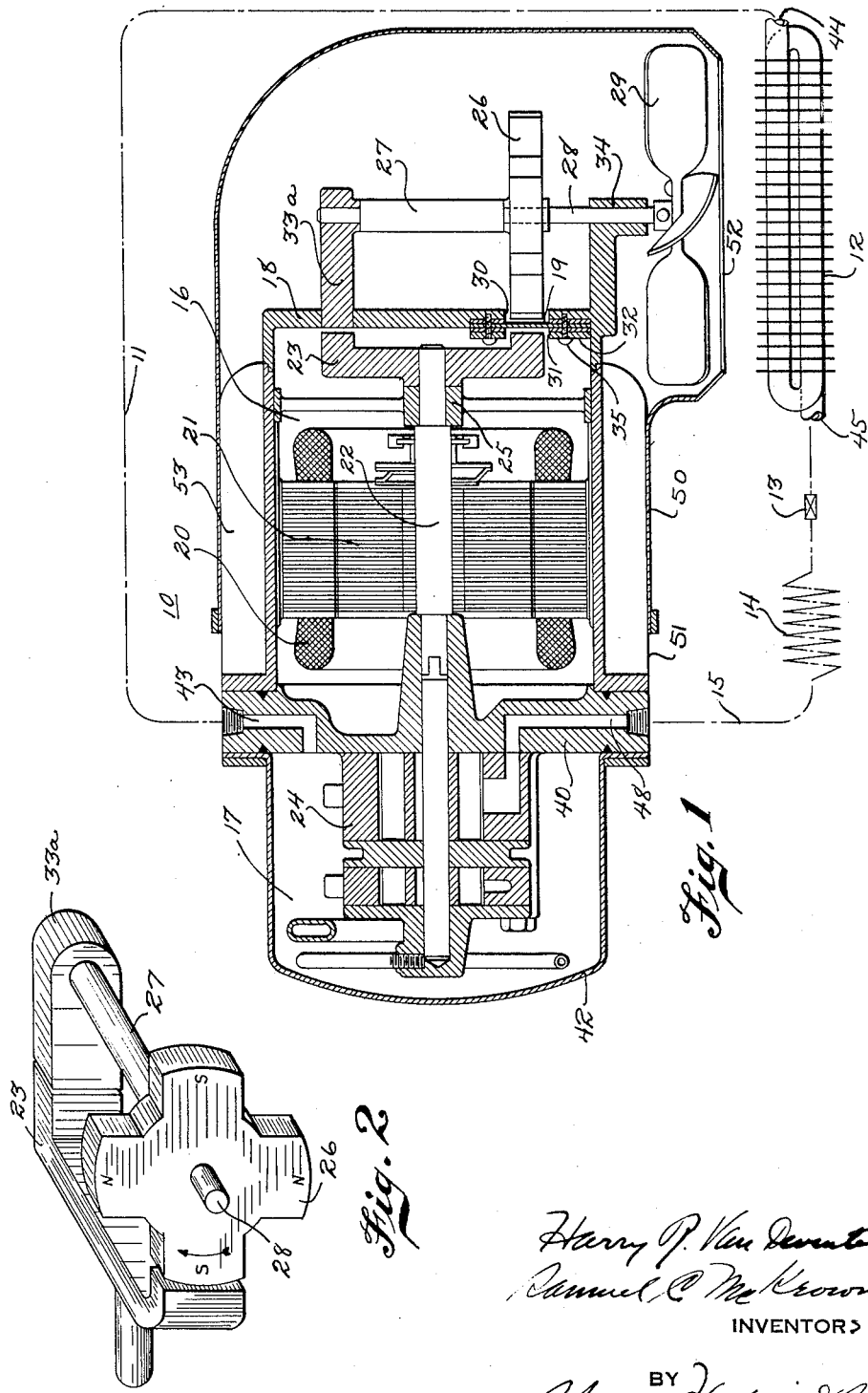
Fig. 1 is a sectional view with parts diagrammatically shown, of a refrigerating system embodying the invention.
Fig. 2 is a perspective view of parts in Fig. 1.

To illustrate the invention, Fig. 1 shows, partly in cross section, and partly diagrammatically, a refrigerating system embodying features of our invention. The refrigerating system includes a motor-compressor unit generally designated as 10 which compresses refrigerant, forwards it through the line 11 to the condenser 12, from whence the refrigerant passes to an expansion valve 13, and through an evaporator 14, back to the motor-compressor unit 10 through the line 15.

The motor-compressor unit 10 has a motor chamber 16 and a compressor-chamber 17. The chamber 16 is closed by means of a cap 18 which is provided with a diaphragm 19 of thin steel of low electrical conductivity or of non-magnetic material, such as brass, aluminum, bakelite, or other substances. The motor stator 20 causes the motor rotor 21 to rotate, which in turn actuates the motor shaft 22 and causes the magnetic arms 23 to rotate while the shaft 22 is actuating the piston structure of the compressor 24. The arms 23 constitute poles of a permanent magnet rotating in the bearing piece 25. The arms rotate near the shell 19 and in turn cause the magnet 26 with its shafts 27 and 28 to rotate, thereby operating the fan 29 mounted on shaft 28 or any other device adapted to be operated by the rotation of the magnet 44.

The diaphragm 19 is held in the opening 30 by packing material 31 and by supporting member 32 secured together by a plurality of screws 33 making a gas tight closure. On the end of the motor shaft 22 is mounted the permanent magnet 23 made as shown in Fig. 2, one pole of the magnet being in close proximity with the diaphragm 19, the opposite pole of the magnet being in close proximity with the end wall 18 of the casing through which is inserted in gas tight relation, a piece of metal 33a of the high magnetic conductivity, such as soft iron, which may also form a bearing for shaft 27 made of a material of like characteristics on which is mounted the permanent magnet 26 made as shown in Fig. 2 and positioned so that its poles rotate in close proximity with the diaphragm 19. Shaft 28 is a projection of shaft 27 but made of some non-magnetic material, such as brass and is supported in the bearing 34 which is formed by a projection from the end wall 18 of the casing or secured thereto in any suitable manner.

When the shaft 22 is revolved by the motor in the fluid tight casing, it carries with it magnet 23, the poles of which will pass in close proximity to the poles of magnet 25 and bearing piece 33a, first magnetically attracting and then repelling, and thereby causing magnet 25 with its shafts 27 and 28, to rotate, thereby operating fan 29 mounted on shaft 28 or any other device adapted to be operated by the rotation of the shaft 28.

The details of a complete refrigeration system being well known, are not further described. The center plate or support 40 supports the pump 24 and forms a bearing for shaft 22 which drives the pump. The interior 17 of the pump housing 42 may connect to space 16 or not, depending upon the type of system. The outlet 43 usually connects to the condenser 12 at 44 and the condensed refrigerant leaves the condenser at 45 and passes through the expansion valve 13 and evaporator 14, returning as gas to the suction side 48 of the pump. This cycle is well known so that it is not described in detail.

The air circulated by the fan 29 enters the shroud 50 at the inlets 51 and is discharged toward the condenser through the outlet 52. However, the flow of air may be reversed, so that the fan 29 causes the air to enter the shroud 50 and 52 and leave the shroud at 51. The shroud 50 is spaced from the casing of the motor-compressor unit by means of radial fins 53 which thus produce air passages between the fins and the cylindrical portion of the shroud 50.

While the form of embodiment of the invention as herein disclosed, constitutes a preferred form, it is to be understood that other forms might be adopted, all coming within the scope of the claims which follow.

What is claimed is as follows:—

1. A fluid tight casing, a diaphragm in said casing, a motor in the casing having an axis of rotation, a fan outside of said casing having an axis of rotation, and magnetic members connected to said motor and fan, and adapted to influence each other through said diaphragm whereby the movement of the motor is imparted to the fan, means supporting the fan with its axis out of alignment with the axis of the motor, the axis of the motor intersecting the axis of the fan substantially at right angles.

2. A fluid tight casing, a diaphragm in said casing, a motor in the casing having an axis of rotation, a fan outside of said casing having an axis of rotation, and magnetic members connected to said motor and fan, and adapted to influence each other through said diaphragm whereby the movement of the motor is imparted to the fan, means supporting the fan with its axis out of alignment with the axis of the motor, the intersection of the axis of the motor with the axis of the fan forming a corner.

3. A fluid tight casing, a diaphragm in said casing, a diaphragm in said casing, a motor in the casing having an axis of rotation, a fan outside of said casing having an axis of rotation, and magnetic members connected to said motor and fan, and adapted to influence each other through said diaphragm whereby the movement of the motor is imparted to the fan, means supporting the fan with its axis out of alignment with the axis of the motor, the axis of the motor being out of alignment with the axis of the fan.

HARRY R. VAN DEVENTER.
SAMUEL C. McKEOWN.